July 4, 1933. R. MALCOM 1,916,678
GOGGLES
Filed Dec. 14, 1931
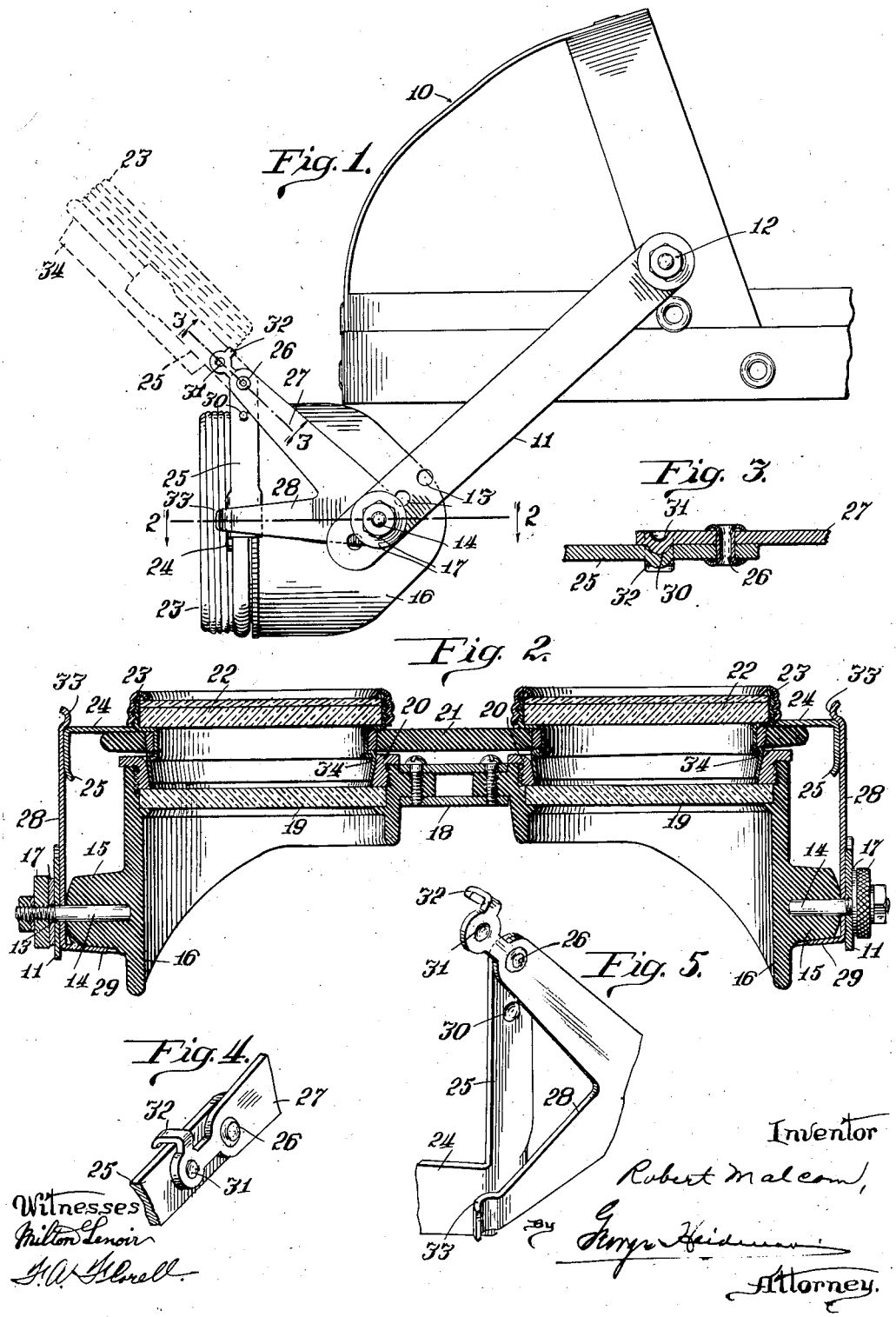
Inventor
Robert Malcom Patented July 4, 1933

1,916,678

UNITED STATES PATENT OFFICE

ROBERT MALCOM, OF CHICAGO, ILLINOIS

GOGGLES

Application filed December 14, 1931. Serial No. 580,873.

My invention relates more particularly to a goggle designed for protecting or shielding the eyes of workmen who are engaged in operations which require proper protection; the invention having for its object the provision of a goggle whereby the eyes of the operator or user will be properly protected by suitable protecting lenses adapted to give clear vision during such operations, as for example metal chipping, etc., and also a goggle provided with suitable lenses, designed to cut out the injurious or actinic rays of a welding flame or torch, which are so arranged that they may be quickly moved into place adjacent the clear lens to enable the operator to carry on welding operations.

My invention contemplates the provision of a single unit or goggle capable of the double use mentioned which enables the user, when the welding operations have been completed, to quickly move the colored lens-holding portion into a position which will enable the operator to have a clear vision of his surroundings and subsequent operations which merely require the use of protecting clear lenses for the eyes, thus obviating the necessity of employing two sets of goggles and consequently obviating loss of time and the necessity of adjusting two sets of goggles to the face or head of the operator.

The objects and advantages of my invention will be readily comprehended from the following detailed description of the accompanying drawing, wherein—

Figure 1 is a side elevation of my improved goggle shown in operative position with a portion of a helmet or head gear broken away and the inoperative position of the welding lenses shown in dotted lines.

Figure 2 is an enlarged cross sectional view taken transversely of the entire goggle and substantially along the line 2—2 of Figure 1.

Figure 3 is a detail sectional view taken substantially on the line 3—3 of Figure 1.

Figure 4 is a detail perspective view of the portion illustrated in Figure 3.

Figure 5 is a detail perspective view of a portion of the welding lens frame and clamping element.

For purposes of exemplification, I have illustrated my invention as especially adapted for use in connection with what is termed a helmet goggle involving a suitable skeleton head gear generally indicated at 10 in Figure 1, with each side of the head gear provided with a bar or arm 11 pivotally secured at 12 so as to swing vertically. The outer end of each arm 11 is shown provided with a plurality of holes as at 13 intended to receive the spindles or threaded pins 14 non-rotatably secured in the enlarged or boss portions 15 on the outer side wall 16 of each eye-piece or cup of the goggle; the holes 13 permitting adjustment of the goggle to suit the location of the eyes of the user. The main portion or original goggle is oscillatably secured to the outer ends of the arms 11 by suitable clamp-nuts and lock-washers as at 17, see Figure 2. The walls of the eye-pieces 16 are of the usual construction, increasing toward the outer or temple sides of the eyes, with the two eye cups or pieces at the nose sides of the eyes properly secured together in any suitable manner, as illustrated, for example at 18 in Figure 2; although it will be understood that various methods of properly and preferably rigidly securing the eye pieces together may be employed.

The idea of swingingly securing the ordinary goggle by means of bars or arms 11 to the sides of a suitable head gear, in itself, constitutes no part of my invention; this construction or type being merely employed for purposes of exemplification.

The goggle, as thus far described, and as is apparent from the drawing, is merely adapted to hold a single clear lens 19 which is preferably removably held in place by a suitable flanged ring 20 adapted to screw into the internally threaded portions of the eye-cups 16. The single lens 19, in each eye cup, is intended to constitute a protecting lens for certain operations, such as metal chipping and the like, and therefore the lens 19 consists of plain glass for clear vision and hence a goggle which is merely adapted for operations of the character mentioned and not adapted for use during welding operations at which time the eyes would be subjected to the dangerous actinic rays of the welding flame.

My invention contemplates the use of a single unit which is adapted for both operations and involves a suitable main body portion 21 adapted to extend throughout the front face of the main goggle; the main body portion at the nose-bridge portion, of course, being shaped in keeping with the shape of the goggle proper so as to fit over the nose. This body portion 21, coincident with the eye piece portions of the main or ordinary goggle, is provided with lens-receiving openings of size commensurate with the size of the eye-pieces of the goggle proper, with said openings formed to provide suitable sockets to receive the colored lenses 22 of a type designed to cut out the actinic rays and permit use for welding operations. The colored lens 22 is removably held in place in any suitable manner as for example by a flange ring or bezel 23 adapted to screw onto the threaded portions or walls of the lens holding portion of the body 21.

Each end of the body or frame 21, to the outside of the lens-holding sockets or openings, is provided with an angular bracket consisting of the outwardly and horizontally disposed portion or arm 24, rigidly secured to the body or frame 21, and of the angularly and upwardly disposed arm 25. These brackets preferably consist of flat sheet metal provided with a black coating so as not to reflect light. The upper ends of the arms 25 are pivotally secured at 26 to the triangular or Y-shaped brackets each consisting of the arm 27 and the arm 28; with the crotch or base portion of the arms 27 and 28 mounted on the spindles or threaded pins 14, and preferably located between the ends of the bracket arms 11 and the boss portions 15 of the eye cup. In order to prevent swinging movement of the triangular brackets, the base ends of the brackets are shown provided with an angularly disposed finger, as at 29, Figure 2, arranged in a groove in the boss portions 15 of the eye-cups 16. This will maintain the brackets in proper position and the arm 28 substantially at the transverse axis of the eye-cups 16 as shown in Figure 1.

The arm 25, at a point removed from its pivotal point 26, is shown provided with a socket at 30 (see Figure 3) for the purpose of receiving the burr or teat 31 formed in the reduced end of the arm 27 whereby the frame-holding bracket, consisting of arm portions 24 and 25, will be held in alignment with arms 27 when the lens-holding body or frame 21 is swung upwardly out of use into the dotted line position shown in Figure 1.

In order to provide a stop for the upward swinging movement, I prefer to provide the outer ends of the arms 27 with the laterally or inwardly disposed fingers or stop members 32 adapted to extend across the upward path of arms 25, see Figure 4. The pivot members 26, preferably in the nature of the rivets disclosed in Figure 3, are so formed as to maintain the ends of arms 25 and 27 in close frictional relation and thus induce the burr 31 to snap into the socket 30.

The outer ends of arms 28 are bent and curved slightly laterally inward, as shown at 33, see Figure 5, so as to snap over or engage with the juncture between arms 24 and 25, see Figures 2 and 5, and thereby firmly hold the welding lens holding frame 21 in close parallel relation with the forward or outer side of the main goggle, with the colored lenses of frame member 21 positioned directly forward of and parallel with the clear lenses of the main goggle in the manner shown in Figure 1.

The lens-holding sockets of the body or frame 21 are preferably provided with the rearwardly disposed annular rim portions 34 disposed entirely about the lens-holding openings in frame 21. These annular rim portions 34, at their outer perimeters, are preferably beveled or tapered, as shown in Figure 2, so as to extend into and snugly fit against the tapered or curved inner perimeters of the lens-holding flanged rings 20 of the main portion of the goggle (see Figure 2) and thus prevent possibility of light-rays entering rearward or about the colored lens holding frame 21 and into the eye-cups of the main goggle.

It is apparent from the construction shown and described that when the operator wearing the goggle intends to perform a welding operation, the colored lens holding frame 21 may be quickly swung downwardly out of the dotted line position shown in Figure 1 so as to bring the frame 21 with its colored lenses forward of and parallel with the main goggle; the downward swinging movement being continued until the ends 33 of the spring arms 28 snap across the outer faces of the frames 24—25 at which time the annular rearwardly disposed rims 34 will have entered the clear lens-holding rings 20 in the manner disclosed in Figure 2 and thus prevent the injurious light-rays passing into the eye-cups and through the clear lenses of the goggle. When the welding operation or operations have been concluded and use for the goggle is still required for eye protection, the operator merely grasps frame 21 and swings it outwardly upward until the burr or teat 31 enters the socket 30 and arms 25 are engaged by the stop fingers or members 32, thereby maintaining the colored lens holding frame 21 in the raised position shown in dotted lines in Figure 1. The brackets and arms may be made of any suitable material, such as sheet metal possessing slight resiliency.

I have chosen to illustrate my invention in conjunction with a helmet type of goggle wherein the goggle proper is swingingly secured to the head gear, but it is apparent that the invention is equally well adapted for use in connection with goggles which may be rigidly secured or held in position in any suitable manner to provide a double duty goggle, and I do not wish to be understood as limiting myself to the pivoted type of goggle shown.

The invention has been described in terms employed merely as terms of description and not as terms of limitation, as modifications are possible and may be made without departing from the spirit of my invention.

What I claim is:

1. A goggle of the character described comprising, in combination with a goggle, lens carrying means adapted to extend across the front of the goggle and provided with a vertically disposed portion, and means immovably secured at the side of the goggle so as to be disposed forwardly and arranged to movably support the lens carrying means, said last means having portions adapted to form locking engagement with the lens carrying means when the latter is moved into and out of operative position.

2. A goggle of the character described comprising, in combination with a goggle having eye-cups, a lens carrying plate adapted to extend across the front of the goggle and provided with openings coincident with the goggle eye-cups, means for removably holding lenses in said openings, the rear side of said plate about said openings having rearwardly disposed portions adapted to contact with the walls of the goggle, a vertically disposed arm secured at the end of the plate, and means secured at the side of the goggle so as to be disposed forwardly, said means being adapted to movably support said arm and to form locking engagement therewith when the lens carrying plate is moved into and out of operative position.

3. A goggle of the character described comprising, in combination with a goggle, a lens carrying plate adapted to extend across the front of the goggle and provided with lens receiving openings, means for holding lenses in the openings and to enclose the lens openings in the goggle, a vertically disposed member at the ends of the plate, a bracket secured at the side of the goggle so as to be disposed forwardly, the bracket being adapted to movably support said member, said bracket having portions adapted to form locking engagement with said member when the plate is moved into and out of operative position.

4. A goggle comprising, in combination with a goggle having eye-cups, a lens-carrying member adapted to extend across the front of the goggle and provided on its rear side with annular projections adapted to enter the eye-cups of the goggle and form light excluding relation with the walls of the eye-cups; means for removably holding lenses in said member; an arm secured at the end of the member and disposed toward the top of said member; and a bifurcated bracket secured to the side of the goggle with the free end of one of the bifurcations swingingly supporting said arm, the arm and said bifurcations having interengaging surfaces for locking the member in its inoperative position, while the free end of the other bifurcation is adapted to form a spring snap locking engagement with the arm and thereby firmly hold the member in snug relation with the front of the goggle.

5. A goggle of the character described comprising, in combination with a goggle having eye-cups; a vertically swinging lens-carrying member disposed at the front of the goggle and provided on its rear side with projections adapted to enter the eye-cups of the goggle and form light excluding relation therewith; an arm secured to each end of said member and having a portion disposed to the top of the member; bifurcated brackets whose bases are immovably secured to the sides of the goggle with the bifurcations disposed forwardly, one end of each arm being pivotally secured to one of the bifurcations of each bracket while the free end of the other bifurcation of each bracket is adapted to snap into a holding engagement with the arm when said member is positioned adjacent the front side of the goggle, the arms and the first mentioned bifurcations having complemental portions for automatically locking the member in raised position; and means whereby upward movement of the member beyond said automatic locking position is prevented.

ROBERT MALCOM.